(12) United States Patent
Almulhim et al.

(10) Patent No.: US 11,713,668 B2
(45) Date of Patent: Aug. 1, 2023

(54) INTEGRATED WELL LOGGING SYSTEMS AND METHODS

(71) Applicant: Saudi Arabian Oil Company, Dhahran (SA)

(72) Inventors: Bassam Khalid Almulhim, Alhufuf (SA); Scott Ashby, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/222,078

(22) Filed: Apr. 5, 2021

(65) Prior Publication Data

US 2022/0316318 A1 Oct. 6, 2022

(51) Int. Cl.
*E21B 47/06* (2012.01)
*G01V 9/00* (2006.01)

(52) U.S. Cl.
CPC ............... *E21B 47/06* (2013.01); *G01V 9/00* (2013.01)

(58) Field of Classification Search
CPC ...... E21B 47/06; E21B 47/08; E21B 17/1021; E21B 47/26; G01V 9/00
See application file for complete search history.

(56) References Cited

U.S. PATENT DOCUMENTS

| | | | | |
|---|---|---|---|---|
| 2,233,740 A | * | 3/1941 | Heater | E21B 17/05 175/305 |
| 5,947,213 A | * | 9/1999 | Angle | E21B 47/12 166/255.2 |
| 7,478,555 B2 | | 1/2009 | Zhan et al. | |
| 9,772,308 B2 | | 9/2017 | Davydov et al. | |
| 2005/0200498 A1 | * | 9/2005 | Gleitman | E21B 17/003 340/854.4 |

(Continued)

FOREIGN PATENT DOCUMENTS

| | | |
|---|---|---|
| CN | 203321494 U | 12/2013 |
| CN | 203515548 U | 4/2014 |

(Continued)

OTHER PUBLICATIONS

Columbia University Division of Marine and Large Programs; "Logging While Drilling EcoScope Tool" available as of Oct. 22, 2020 at: https://mlp.ldeo.columbia.edu/research/technology/schlumberger-lwd-tools/logging-while-drilling-ecoscope-tool/; pp. 1-5.

(Continued)

*Primary Examiner* — Theodore N Yao
(74) *Attorney, Agent, or Firm* — Bracewell LLP; Constance G. Rhebergen; Keith R. Derrington

(57) ABSTRACT

An integrated well logging system includes an elongated stem portion configured to lower the well logging system into a hydrocarbon well, a multi-finger calipers for measuring the internal diameter of the annulus of the hydrocarbon well, the multi-finger calipers comprising a plurality of measuring arms, a first crossover configured to connect the stem portion to the multi-finger calipers, a static bottom hole pressure survey configured to measure the pressure at a location within the hydrocarbon well, the static bottom hole pressure survey comprising a plurality of memory gauges, and a second crossover configured to connect the multi-finger calipers to the static bottom hole pressure survey.

7 Claims, 4 Drawing Sheets

(56) References Cited

U.S. PATENT DOCUMENTS

| | | | | |
|---|---|---|---|---|
| 2009/0101337 A1* | 4/2009 | Neidhardt | ............... | E21B 47/08 |
| | | | | 166/250.01 |
| 2014/0138084 A1* | 5/2014 | Al-Mulhem | ........ | E21B 41/0035 |
| | | | | 166/50 |
| 2015/0346379 A1 | 12/2015 | Wyts | | |
| 2018/0066513 A1* | 3/2018 | Sugiura | ..................... | E21B 7/06 |
| 2018/0172418 A1* | 6/2018 | Ohmer | ................... | E21B 47/08 |
| 2019/0116085 A1* | 4/2019 | Zhang | ..................... | E21B 47/14 |
| 2020/0049481 A1* | 2/2020 | Harrigan | ............... | E21B 47/085 |
| 2022/0076721 A1* | 3/2022 | Leslie | ..................... | G11C 8/18 |

FOREIGN PATENT DOCUMENTS

| | | | | | |
|---|---|---|---|---|---|
| CN | 207598231 U | | 7/2018 | | |
| CN | 110273676 A | * | 9/2019 | ............ | E21B 43/20 |
| CN | 210460629 U | | 5/2020 | | |
| SU | 1332009 A1 | | 8/1987 | | |
| WO | 2020071918 A1 | | 4/2020 | | |

OTHER PUBLICATIONS

International Ocean Discovery Program; "IODP Expedition 319 Scientific Prospectus" available as of Oct. 22, 2020 at: http://publications.iodp.org/scientific_prospectus/319/319_f10.htm; p. 1.
Oil & Gas Journal; "Modified coiled tubing logs short-radius well" Sep. 19, 2005; available as of Oct. 22, 2020 at: https://www.ogj.com/general-interest/companies/article/17235605/modified-coiled-tubing-logs-shortradius-well; pp. 1-3.

* cited by examiner

INTEGRATED WELL LOGGING SYSTEMS AND METHODS

BACKGROUND OF THE INVENTION

1. Technical Field

Embodiments generally relate to well logging tools used in the oil and gas industry, and specifically relate to determination or mapping of reservoir pressure over a region of interest in a subsurface reservoir with integration of static bottom-hole pressure survey data and the monitoring of tubing condition with a multi-finger caliper tool.

2. Description of Related Art

In the oil and gas industries, massive amounts of data are required to be processed for computerized simulation, modeling and analysis for exploration and production purposes. For example, the development of underground hydrocarbon reservoirs typically includes development and analysis of computer simulation models of the reservoir. These underground hydrocarbon reservoirs are typically complex rock formations which contain both a petroleum fluid mixture and water. The reservoir fluid content usually exists in two or more fluid phases. The petroleum mixture in reservoir fluids is produced by wells drilled into and completed in these rock formations.

A computer reservoir model with realistic geological features and properties, appropriate distribution of in-situ fluids, as well as initial pressure conditions of the fluids also help in forecasting the optimal future oil and gas recovery from hydrocarbon reservoirs. Oil and gas companies have come to depend on such models as an important tool to enhance the ability to exploit a petroleum reserve.

It is desirable to be able to monitor pressure conditions in such a reservoir so that production is optimized. Adjustments can be made in production or injection rates to remove undesirable high or low pressure regions that might be observed from such monitoring. For reservoir planning purposes, the reservoir is simulated in a computer and runs are made of estimated production for a range of times over the projected life of the reservoir.

In simulation models, the reservoir is organized into a number of individual cells. Seismic data with increasing accuracy has permitted the cells to be on the order of 25 meters areal (x and y axis) intervals. For what are known as giant reservoirs, the number of cells is at least hundreds of millions, and reservoirs of what is known as giga-cell size (a billion cells or more) are encountered.

An example reservoir of the type for which production data are simulated over the expected reservoir life is usually one which is known to those in the art as a giant reservoir. A giant reservoir may be several miles in length, breadth and depth in its extent beneath the earth and might, for example, have a volume or size on the order of three hundred billion cubic feet.

The reservoir is organized into a matrix which corresponds to the three dimensional extent of the reservoir and is composed of a number of contiguous 3-dimensional cells. It is common for a reservoir matrix to contain millions of cells to obtain as accurate an indication of reservoir conditions as feasible. Actual reservoir models may have several millions of such cells.

For reservoirs of this type, the actual number of wells may also be on the order of a thousand, with each well having a number of perforations into producing formations. Typically, not all of the wells in a reservoir have what are known as permanent downhole pressure gauges in them to monitor reservoir at those locations. This however represents a pressure measurement at only one point in the huge volume of the reservoir.

Thus, only a relatively small number of wells in a reservoir have such pressure gauges and as mentioned, the reservoir may have a substantial extent in terms of subsurface breadth, width and depth, leading to a very large number of cells in the model. The data points are extremely scarce when compared to the reservoir volume.

Therefore, the conditions and spatial quantity under which the actual well pressure is measured are completely different than the reservoir pressure which reservoir engineers are interested in for reservoir production optimization. Pressure measurements at the limited number of wells having gauges in the reservoir do not provide an accurate indication of reservoir pressure conditions of interest over the full 3-dimensional extent of the reservoir.

So far as is known, in previous isobaric mapping techniques, the well's static bottom-hole pressure (SBHP) readings were used to generate isobaric maps. Each SBHP reading was a control point based on which the isobaric map was generated. The interpolation between the control points was a simple linear interpolation that did not account for geological features nor for reservoir dynamics during production.

SUMMARY

Briefly, the present disclosure relates to an integrated well logging tool including a SBHP survey and a multi finger caliper, combined into one tool.

One embodiment is an integrated well logging system including an elongated stem portion configured to lower the well logging system into a hydrocarbon well, a multi-finger calipers portion for measuring the internal diameter of the annulus of the hydrocarbon well, the multi-finger calipers portion including a plurality of measuring arms, a first crossover configured to connect the stem portion to the multi-finger calipers portion, a static bottom hole pressure (SBHP) survey portion configured to measure the pressure at a location within the hydrocarbon well, the static bottom hole pressure survey portion including one or more memory gauges, and a second crossover configured to connect the multi-finger calipers portion to the SBHP survey portion.

In one embodiment, the SBHP survey portion includes a plurality of memory gauges connected in series. The elongated stem portion further includes a rope socket, a third crossover, a swivel joint, an elongated stem, and a knuckle jar. The multi-finger calipers portion includes a battery housing, a memory gauge, and a first plurality of bendable caliper arms. The battery housing includes a steel case configured to isolate electronics, power supplies, and sensors from the borehole. The memory gauge includes an electronic pressure gauge that samples and records downhole pressures, with the data being stored in a non-volatile memory, ready for downloading to an acquisition equipment when the system has been retrieved to the surface. The multi-finger calipers portion further includes a multi-finger caliper tool, a second plurality of bendable caliper arms, and a fourth crossover. In one embodiment, the multi-finger caliper tool includes about 20 to 120 fingers or measuring arms, such that as the multi-finger caliper tool is logged up the casing or tubing, the fingers run along the internal wall to provide a continuous measurement of a surface condition. One advantage of the disclosed system is that a SBHP survey job is conducted while running in hole and after the system reaches a target depth, the measuring arms of the multi-finger calipers log from the targeted depth to the surface, such that the SBHP survey and the caliper log is performed in the same run.

Another embodiment is a method for performing a static bottom hole pressure survey and caliper log in a single run. The method includes providing an elongated stem portion to lower an integrated well logging system into a hydrocarbon well, providing a multi-finger calipers portion for measuring the internal diameter of the annulus of the hydrocarbon well, the multi-finger calipers portion including a plurality of measuring arms, providing a first crossover to connect the stem portion to the multi-finger calipers portion, providing a static bottom hole pressure (SBHP) survey portion to measure the pressure at a location within the hydrocarbon well, the static bottom hole pressure survey portion including one or more memory gauges, and providing a second crossover to connect the multi-finger calipers portion to the SBHP survey portion.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION OF THE EMBODIMENTS

The methods and systems of the present disclosure can now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure can be thorough and complete, and can fully convey its scope to those skilled in the art. Like numbers refer to like elements throughout.

Figure 1:
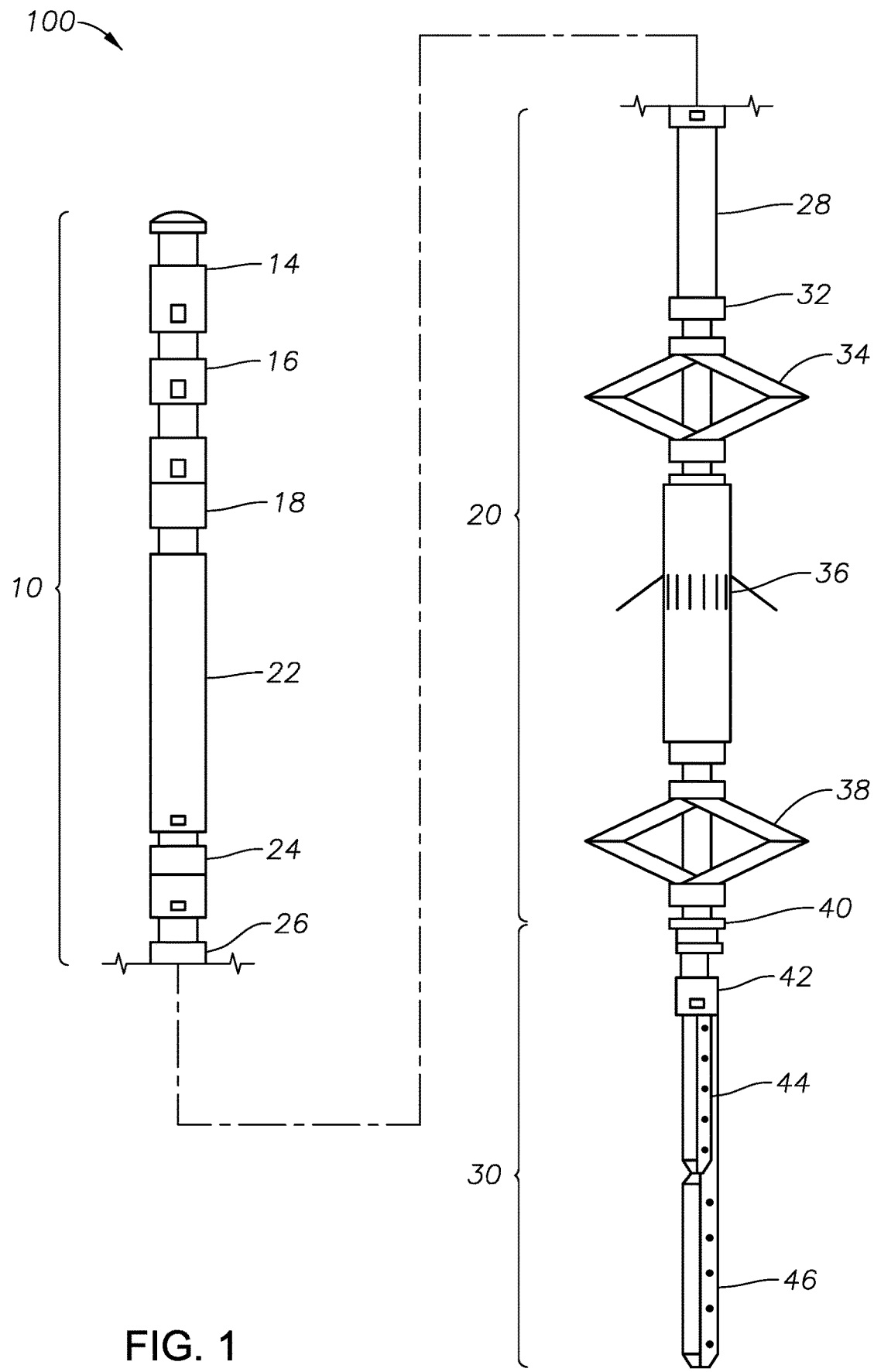
FIG. 1 is a schematic diagram of an integrated well logging system, according to one example embodiment.

Turning now to the figures, FIG. 1 illustrates an integrated well logging system 100, according to one example embodiment. The system 100 includes an elongated stem portion 10 configured to lower the well logging system 100 into a hydrocarbon well, a multi-finger calipers portion 20 for measuring the internal diameter of the annulus of the hydrocarbon well, a first crossover 26 configured to connect the stem portion 10 to the multi-finger calipers portion 20, a static bottom hole pressure survey 30 configured to measure the pressure at a location within the hydrocarbon well, and a second crossover 42 configured to connect the multi-finger calipers portion 20 to the static bottom hole pressure survey 30. The multi-finger calipers portion 20 may include a plurality of measuring arms, which will be described in further detail in FIG. 4. The static bottom hole pressure survey 30 may include a plurality of memory gauges 44, 46, connected in series, as illustrated in FIG. 1.

The elongated stem portion 10 may include a rope socket 14, a crossover 16, which may be a short subassembly used to enable two components with different thread types or sizes to be connected, a swivel joint 18, which is a mechanical device that suspends the weight of the toolstring. The swivel joint 18 is designed to allow rotation of the toolstring beneath it conveying high volumes of high-pressure drilling mud between the rig's circulation system and the toolstring. The stem portion 10 may also include an elongated stem 22, and a knuckle jar 24, which is a type of jar that incorporates a mechanical trip or firing mechanism that activates only when the necessary tension or compression has been applied to the running string. In slickline operations, the term is often used to describe any jar that does not contain a hydraulic trip mechanism, such as link and tubular jars that do not incorporate a firing mechanism.

The multi-finger calipers portion 20 may include a battery housing 28, which may be an outside steel case of a cartridge or a sonde in a wireline logging tool. The housing 28 isolates the electronics, power supplies and sensors from the borehole and bears the pressure burden. The multi-finger calipers portion 20 may further include a memory, for example, a computer storage medium for storing data for the MIT tool. The multi-finger calipers portion 20 may further include a first centralizer, a bendable caliper arm 34, and a multi-finger caliper 36 e.g. MIT-037 (UW 40F), which is a device for measuring the diameter of the internal wall of a casing or tubing using multiple arms. Centralisers are included in the BHA to keep the tool centred above and below the MIT itself, and is required for accurate measurements. By using a large number of arms, or fingers, the caliper can detect small changes in the wall of the pipe. The main purpose of the measurement is to detect deformations, the build up of scale or metal loss due to corrosion. Typical multi-finger calipers have between about 20 and 120 fingers, the larger numbers being necessary in larger pipes. The multi-finger calipers portion 20 may further include a second centralizer, a bendable caliper arm 38, and a crossover 40, e.g. Sondex™. A crossover 26 may be used to couple the elongated stem portion 10 and the multi-finger calipers portion 20 of the integrated system 100.

The SBHP portion 30 includes a plurality set of memory gauges 44, 46, which is type of electronic pressure gauge that samples and records downhole pressures, with the data being stored, ready for downloading to acquisition equipment when the tool assembly has been retrieved to surface. Memory gauges are generally used to measure bottom hole pressures and temperatures in response to various production rates in tests to assess well productivity and reservoir performance. With the Ultrawire™ memory tool, data from the logging sensors is transmitted to the UMT at the top of the string. Data is stored in non-volatile flash memory chips under the control of a downhole processor. This tool can support all the standard GE Sondex Ultrawire™ tools. A crossover 42 may be used to couple the multi-finger calipers portion 20 and the SBHP portion 30 of the integrated system 100. An Ultrawire™ UMT-007 is a type of electronic pressure gauge that samples and records downhole pressures, with the data being stored, ready for downloading to acquisition equipment when the tool assembly has been retrieved to surface. Memory gauges are generally used to measure bottom hole pressures and temperatures in response to various production rates in tests to assess well productivity and reservoir performance.

Static Bottom Hole Pressure surveys (SBHPs) and caliper logs are part of the normal annual well surveillance requirements. Occasionally, a specific well can have both SBHP and caliper log jobs to be performed in the same year. In order to perform both jobs on the same well to comply with the requirements, two runs have to be made, one for the SBHP, and the second one is for the caliper log.

However, in the system 100 disclosed in FIG. 1, both SBHP and caliper logs are deployed in the same run by connecting memory gauges for the SBHP job below the multifinger imaging tool (MIT) with a cross over in between to connect both tools. The SBHP job is conducted while running in hole and once the tool reaches the target depth, the MIT fingers open (activate) and the MIT will log from the targeted depth to the surface. The inventive idea is to perform a SBHP surveys and a caliper log in the same run.

SBHP surveys are used to measure the reservoir pressure in a particular well and are performed at regular intervals in the life of a well. Multi-arm caliper logs are used to measure the tubing corrosion or scale build up in a particular well and are also performed at regular intervals in the life of a well. FIG. 1 shows a bottom hole assembly (BHA) for combining the SBHP and caliper log in the same run. The tool is run in hole, e.g. to connect pipe together and lower the connected length into the borehole in a controlled fashion, on a slickline or its equivalent. The pipe lengths are usually screwed together either with rotary-shouldered connections for the toolstring, or threaded and coupled connections for casing, liners and most tubings. The pressure record for the SBHP can be made while the tool is run in hole until reaching a predetermined target depth. The caliper log fingers open automatically upon reaching the target depth, it is a memory tool and the fingers are activated at a preset time. The tool is pulled up the well and the tubing is logged with the multi-arm caliper until reaching the surface. It should be noted, however, that the programming table for the caliper log is adjusted to take into consideration the gradient stops for SBHP while run in hole. FIG. 1 shows the new BHA to combine both SBHP and caliper log in the same run.

The present disclosure discusses a method and system where both Static Bottom Hold Pressure Survey (SBHP) and caliper log are deployed in the same run by connecting memory gauges for the SBHP job below the MIT with a cross over in between to connect both tools. The SBHP job is conducted while running in hole and once the tool reaches the target depth, the MIT fingers open and the MIT logs from the targeted depth to the surface. The caliper log fingers are opened when reaching the target depth, e.g. it is a memory tool and the fingers are activated at a predetermined time. The tool is pulled up the well and the tubing is logged with the multi-arm caliper till reaching the surface. The programming table for the caliper log is adjusted to take into consideration the gradient stops for SBHP while run in hole.

Figure 2:
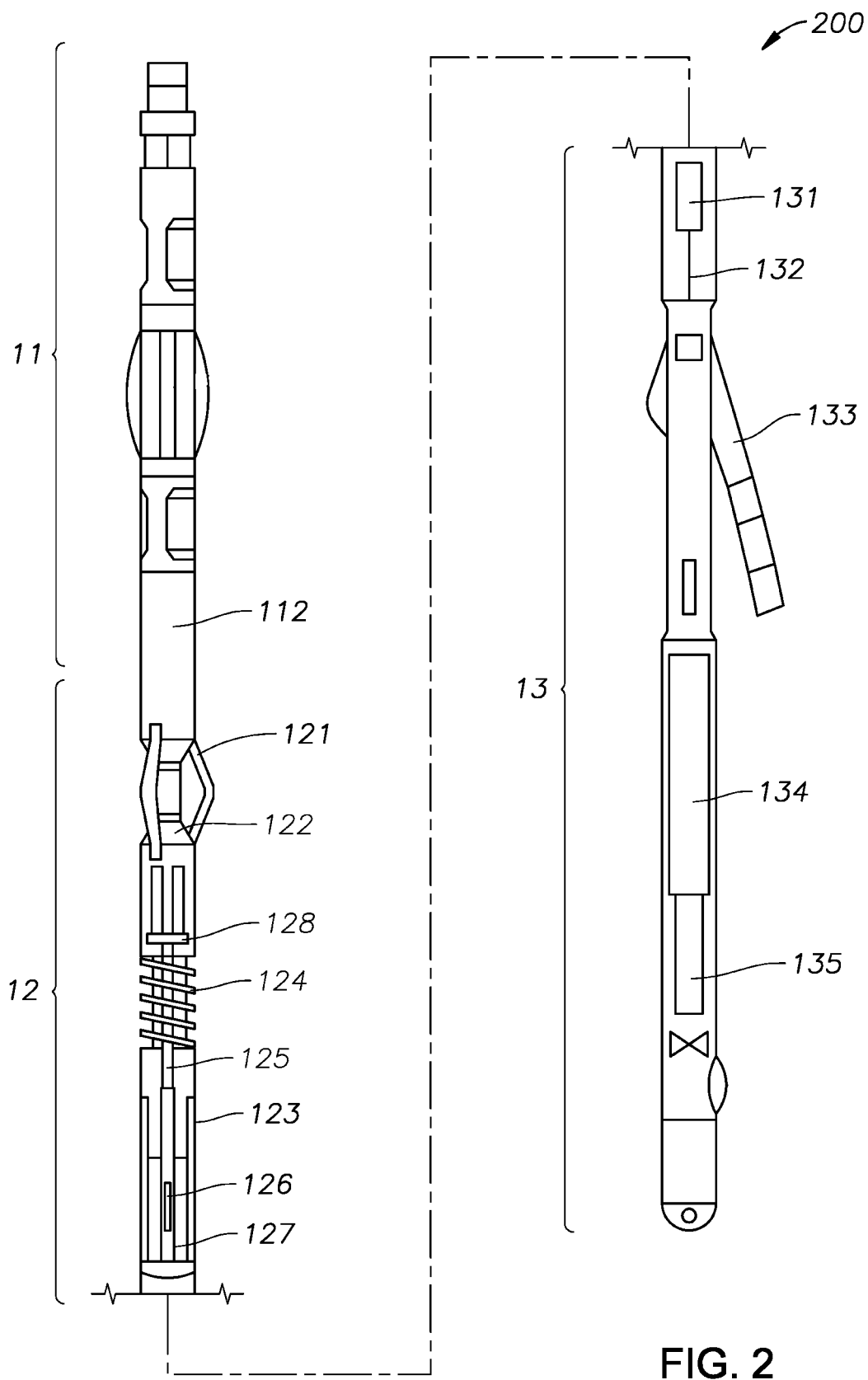
FIG. 2 is a schematic diagram of another integrated well logging system, according to one example embodiment.

FIG. 2 is a schematic diagram of another integrated well logging system 200, according to one example embodiment. This hole diameter flow rate timing test system includes hole diameter flow rate timing appearance, ground numerical control device, and host computer, and wherein, host computer links to each other with ground numerical control device, and ground numerical control device is connected to the cable head at top of hole diameter flow rate timing appearance through cable for providing the power supply and carrying out two-way communication with hole diameter flow rate timing system for hole diameter flow rate timing. The system 200 comprises an ultrasonic flow nipple 11, a hole diameter measuring nipple 12, and a measurement and regulation control nipple 13 which are sequentially connected, wherein the ultrasonic flow nipple 11 is used for measuring downhole flow data, temperature data and pressure data and sending the downhole flow data, the temperature data and the pressure data to the measurement and regulation control nipple 13, the hole diameter measuring nipple 12 is used for measuring hole diameter data and sending the hole diameter data to the measurement and regulation control nipple 13, and the measurement and regulation control nipple 13 is used for sending the flow data, the temperature data, the pressure data and the hole diameter data to the ground numerical control device. The ground numerical control device is connected with an upper computer and is used for uploading flow data, temperature data, pressure data and hole diameter data to the upper computer. The upper computer is used for processing and analyzing the flow data, the temperature data, the pressure data and the hole diameter data to generate a control signal so as to control the butt joint of the hole diameter flow regulator and the water distributor and regulate the water nozzle opening of the water distributor.

With continued reference to FIG. 2, the hole diameter flow regulator of the present embodiment includes an ultrasonic flow nipple 11, a hole diameter measuring nipple 12, and a measurement and regulation control nipple 13, which are detachably connected together in sequence along the axial direction. Between 11 and the well diameter measurement nipple joints 12 of flow nipple joint to and be connected with the detachable mode between well diameter measurement nipple joints 12 and the measure and regulate control nipple joint 13, for example can link to each other through four coaxial socket of rammo and plug respectively, guarantee that three nipple joint can dismantle wantonly, convenient maintenance and change.

Further, the ultrasonic flow nipple 11 includes a flow probe 111, a flow control module 112, a temperature sensor (not shown in the drawings), and a pressure sensor (not shown in the drawings). Specifically, the flow probe 111, the temperature sensor and the pressure sensor are disposed at the top end of the ultrasonic flow nipple 11, and the flow control module 112 is disposed below the flow probe 111. The flow probe 111, the temperature sensor and the pressure sensor are respectively electrically connected with the flow control module 112, and the flow control module 112 is electrically connected with the measurement and regulation control nipple 13. The flow probe 111 can send and receive ultrasonic signals, obtain downhole flow information according to the signals, and then send the flow information to the flow control module 112. The temperature sensor can measure the fluid temperature of oil reservoir, forms temperature data, pressure sensor can measure the fluid pressure of oil reservoir forms pressure data, and flow control module 112 can gather flow data, temperature data and pressure data to send to measure and regulate control nipple joint 13, in this embodiment, measure and regulate control nipple joint 13 can be connected to ground numerical control device, and will flow data, temperature data and pressure data send to ground numerical control device.

The measurement and adjustment control pup joint 13 of the embodiment comprises a measurement and adjustment control motor 131, a measurement and adjustment transmission system 132, an adjusting arm assembly 133 and a measurement and adjustment control module 134, wherein the measurement and adjustment control module 134 is electrically connected with the flow control module 112, the borehole diameter control module 127 and the measurement and adjustment control motor 131, the measurement and adjustment transmission system 132 is connected with the measurement and adjustment control motor 131 and the adjusting arm assembly 133, and the free end of the adjusting arm assembly 133 extends out of the measurement and adjustment control pup joint 13.

In the present embodiment, the metering drive train 132 may be a drive gear set or other conventional drive assembly. In this embodiment, the measurement and adjustment control module 134 is disposed below the adjustment arm assembly 133, includes a decoding circuit and a code sending circuit, is electrically connected to the ground numerical control device, and is used for communicating with the ground numerical control device, the flow control module 112, and the hole diameter control module 127. Similarly, the flow control module 112 and the hole diameter control module 127 may also include a decoding circuit and a code sending circuit, respectively, to communicate with the relevant components, and the specific processes have been described in detail above and are not described herein again.

In addition, the testing and adjusting control module 134 further includes a driving circuit, which is electrically connected to the decoding circuit and the code sending circuit, and is configured to drive the adjusting arm assembly 133 to open according to the adjusting arm assembly opening signal sent by the ground numerical control device, and drive the testing and adjusting control motor 131 to rotate according to the testing and adjusting control motor driving signal sent by the ground numerical control device.

Specifically, the measurement and adjustment control module 134 can control the forward and reverse rotation of the measurement and adjustment control motor 131, and the measurement and adjustment control motor 131 drives the measurement and adjustment transmission system 132 to rotate, so that the adjusting arm assembly 133 can complete arm opening and closing and positive and negative adjustment actions, so as to be in butt joint with the adjusting arm assembly 133 and the eccentric water distributor, and perform water nozzle forward adjustment and negative adjustment operations of the eccentric water distributor through the adjusting arm assembly 133. It should be noted that the measurement and adjustment control module 134 is not only responsible for the control, state detection and cable head signal transmission of the measurement and adjustment control motor 131, but also responsible for packaging the flow data from the flow control module 112 and the hole diameter data from the hole diameter control module 127, and then sending the packaged data to the ground numerical control device in a digital coding manner. And then, the ground numerical control device finishes the data and uploads the data to the upper computer, the upper computer judges and sends a command according to the flow data after the borehole diameter compensation, the command is sent to the measurement and regulation control module 134 through the ground numerical control device, and the measurement and regulation control module 134 performs large-opening and small-closing control on the water nozzle of the underground eccentric water distributor according to the command, so that the measurement and regulation of layered water injection are realized. Specifically, after receiving the measurement and adjustment control motor driving signal sent by the ground numerical control device, the driving circuit drives the measurement and adjustment control motor 131 to perform forward rotation, reverse rotation and stop actions, and the forward rotation, reverse rotation and stop actions of the measurement and adjustment control motor 131 drive the measurement and adjustment transmission system 132, so as to drive the adjusting arm.

Figure 3:
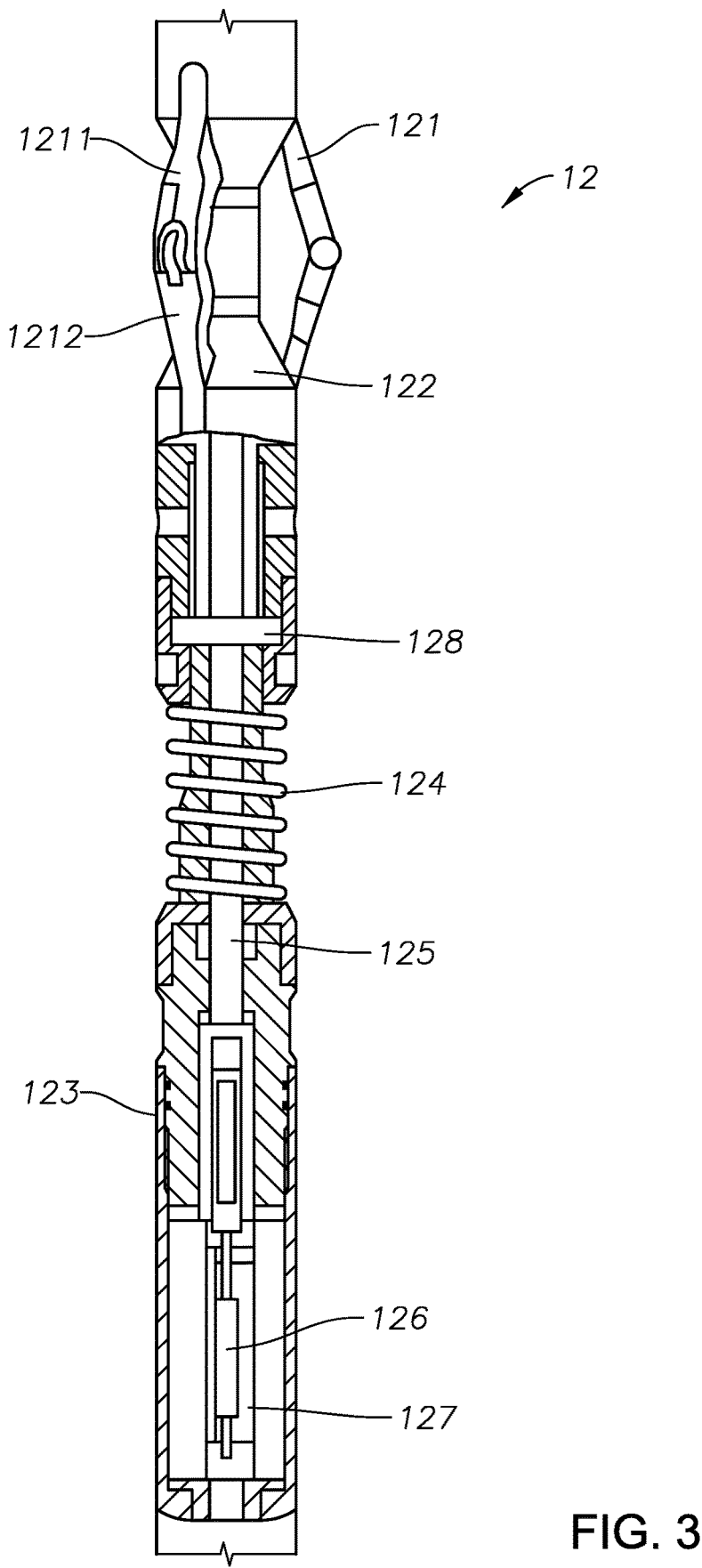
FIG. 3 is a schematic diagram of a portion of an integrated well logging system, according to one example embodiment.

FIG. 3 is a schematic diagram of a portion 12 of an integrated well logging system 200, according to one example embodiment. The caliper sub 12 includes a bendable caliper arm 121, a movable barrel 122, a fixed barrel 123, a spring 124, a center rod 125, a displacement sensor 126, and a caliper control module 127. A plurality of caliper arms 121 may be included, the caliper arms 121 are uniformly distributed around the circumference of the caliper nipple 12, and one end of the caliper arms 121 is connected to the outer casing of the ultrasonic flow nipple 11, and the other end is connected to the movable cylinder 122. As shown in FIG. 2, the caliper gauge 12 of this embodiment includes three bendable caliper measuring arms 121, which are uniformly distributed at an included angle of 120° outside the caliper gauge 12. The caliper arm 121 of the present embodiment includes a first arm 1211 and a second arm 1212, which are hinged, wherein the first arm 1211 is rotatably connected to the housing of the flow control module 112, the second arm 1212 is rotatably connected to the side wall of the movable cylinder 122, and the connecting portion of the first arm 1211 and the second arm 1212 extends outward so as to form an angle.

A spring 124 is fitted over the center rod 125, and one end of the spring 124 abuts against the movable barrel 122 and the other end abuts against the fixed barrel 123, so that the movable barrel 122 can move up and down with respect to the fixed barrel 123. The center rod 125 has one end connected to the movable cylinder 122 and the other end connected to the fixed cylinder 123. In this embodiment, the upper end of the center rod 125 passes through the inner cavity of the movable cylinder 122 and is connected to the ultrasonic flow nipple 11, and the other end axially extends into the inner cavity fixedly connected to the fixed cylinder 123 and is tightly connected with the fixed cylinder 123. The displacement sensor 126 and the hole diameter control module 127 are disposed at the lower end of the center rod 125, and the displacement sensor 126 is electrically connected to the hole diameter control module 127.

Further, the caliper sub 12 further includes a locking ring 128, the locking ring 128 is circumferentially clamped on the inner wall of the movable cylinder 122, and the central rod 125 extends into the locking ring 128 to be limited in the inner cavity of the movable cylinder 122, so that the whole structure has higher stability during movement. As described above, in an actual oil exploitation process, according to actual construction conditions on an oil field, during a flow measurement process, a downhole string may be deformed in an inner diameter due to various situations such as collision, corrosion, deposition, and wax deposition. The existing flow measuring method is designed based on a uniform model with the upper and lower consistent sections in the pipe column, and the conditions of corrosion, scaling and deformation of the pipe column are not considered, so that the measured flow data has a certain error with the actual flow. The caliper gauge of the present embodiment includes a caliper measuring arm 121 extending out of the gauge body, and in a normal state, since the movable cylinder 122 is pressed by the urging force of the spring 124, the caliper measuring arm 121 is in a normally open state, and the movable cylinder 122 is connected to the central rod 125 through the locking ring 128 to drive the displacement sensor 126 to stretch, so that the displacement sensor 126 is in a maximum position state. In the instrument downhole process, the borehole diameter measuring arm 121 is in real-time contact with the borehole wall and is squeezed by the borehole wall, so that the borehole diameter measuring arm 121 tends to move inward along the axial direction of the borehole diameter flow rate adjuster, that is, the hinged part between the first arm 1211 and the second arm 1212 rotates relatively, so that the included angle between the first arm 1211 and the second arm 1212 is increased, the movable cylinder 122 is further pushed to overcome the elastic force of the spring 124 and then drive the central rod 125 to move downward, then the displacement sensor 126 positioned at the lower end of the central rod 125 also moves downward, the position of the displacement sensor changes, a displacement signal is formed, and the displacement signal is collected by the borehole diameter control module 127 and then processed into borehole diameter data. In this embodiment, the hole diameter control module 127 is connected to the measurement and adjustment control sub 13, and the hole diameter data is sent to the ground numerical control device 2 through the measurement and adjustment control sub 13.

Figure 4:
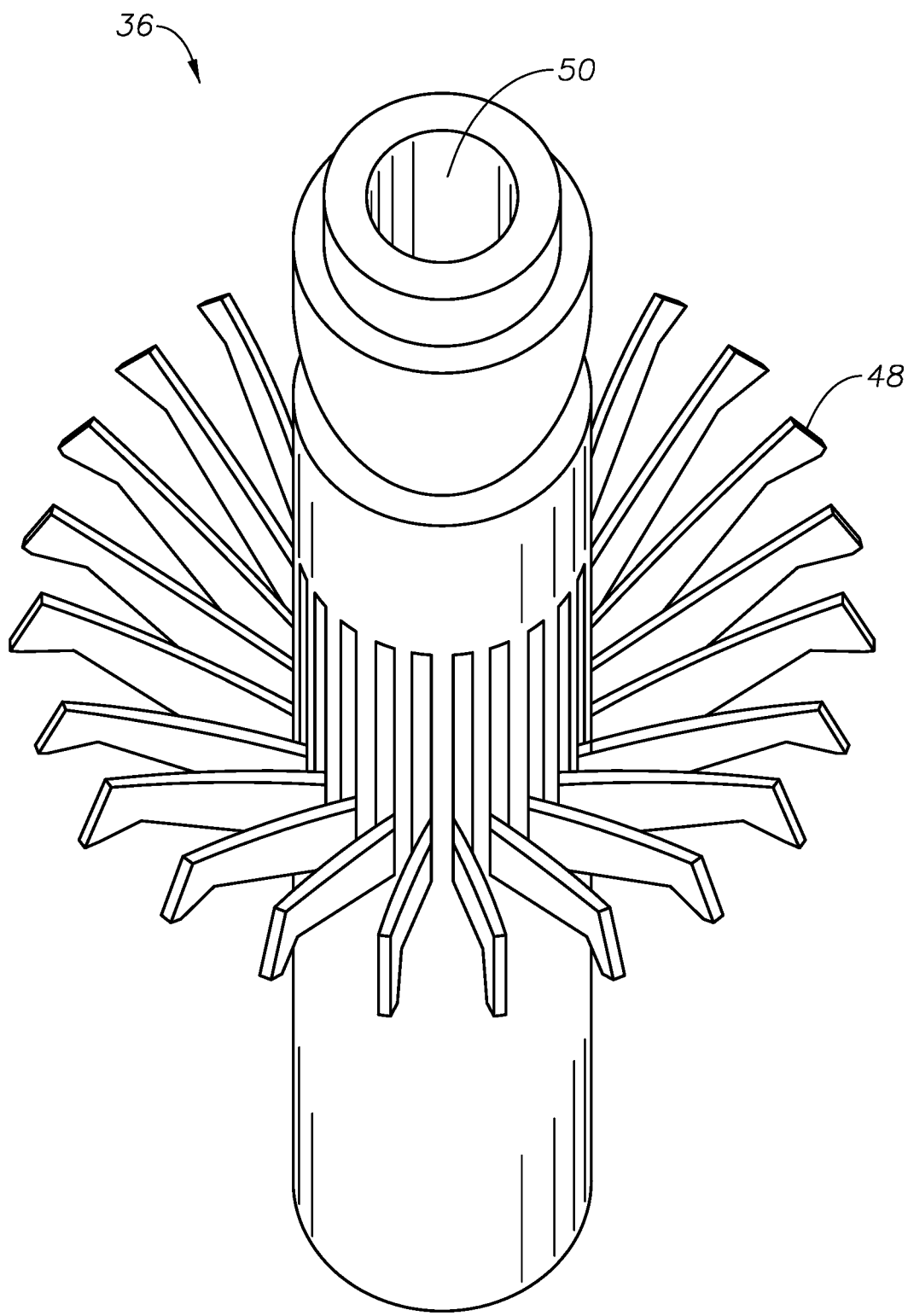
FIG. 4 is a photograph of a single component in an integrated well logging system, according to one example embodiment.

FIG. 4 is a photograph of a MIT 36 in an integrated well logging system 100, according to one example embodiment. MIT 36 may be used in quantifying extent of corrosion and scale/wax/solids build up, accurately detecting and locating holes, anomalies, or axially oriented metal loss, and assessing mechanical damage and pipe distortion. The advantages of using MIT 36 in the system 100 include accurately determining casing wear profile for improved remedial action planning, tracking the effectiveness of scale and corrosion mitigation chemical treatment programs, and getting processed data back in 12-18 hours for faster mitigation and repair turnarounds. MIT 36 is a mechanical caliper device that detects very small changes and relatively minor defects early, before they escalate to more serious and expensive issues impacting casing string integrity.

The MIT may be available in a range of diameters to suit varying casing and tubing sizes. It is also available in a range of finger configurations (48) from 20 up to 120 individual measurements, depending on the required resolution. The fingers 48 increase with the diameter of the tool to maintain maximum surface coverage. The tool 36 can be run in combination with other well integrity instruments and production logging tools.

When the MIT tool is run in hole, the fingers are closed to prevent damage. Once at logging depth, a motor is activated to open the fingers and extend them out from the tool body 50. As the tool is logged up the casing or tubing, the fingers run along the internal wall to provide a continuous measurement of the pipe's surface condition. The tool includes an inclinometer to indicate the finger positions relative to the high side of the pipe, which allows features to be orientated correctly during data processing.

One can generate 3D images of the pipe condition by incorporating the MIT data into a processing software, e.g. the Sondex™ Well Integrity Visual Analysis (WIVA) software, and also gain a detailed statistical analysis of the pipe condition by using the MIT data in the Well Integrity Processing, Evaluation and Reporting (WIPER) software.

With the present invention, Bottom-Hole Pressure (SBHP) or pressure survey data measured at or near the depth of a producing formation interval data is entered and honored at the well locations with respect to the desired reference datum depth. Establishing the wells SBHP pressures as control points, the 3-dimensional pressure between the wells is estimated based on results of the numerical simulation by reservoir simulator R based on governing equations and relationships representing actual thermodynamics and geophysics, as well as the most updated geological realization of the subsurface reservoir illustrated as model M. The present invention reduces turnaround time for generation of maps and quality checking the data contents displayed in the maps and stored in the data processing system for evaluation of further processing or analysis.

The integration between the SBHP pressure points and simulation pressure results in a 3D grid populated with estimated reservoir pressure based on appropriate reliability and conformance with statistical quality analysis and control methods (such as Distance-Weighted Moving Average or DWMA). The data processing system D then adjusts the pressure values to the datum reference depth, if needed. Several alternative methods are then available for collapsing the 3-dimensional pressure grid array into a single layer (2-dimensional) while also taking into account geological features, aerial and vertical heterogeneity, and numerical model constraints. The resultant product, a 2-dimensional isobaric map of a reservoir region of interest, is the provided and made available to a variety of visualization and quality control tools for reservoir management engineers to utilize.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

What is claimed is:

1. A method for performing a static bottom hole pressure survey and caliper log in a single run, the method comprising:
    providing an elongated stem portion to lower an integrated well logging system into a hydrocarbon well;
    providing a multi-finger calipers portion for measuring the internal diameter of an internal wall of the hydrocarbon well, the multi-finger calipers portion comprising a plurality of measuring arms;
    providing a first crossover to connect the stem portion to the multi-finger calipers portion;
    providing a static bottom hole pressure (SBHP) survey portion to measure a pressure at a location within the hydrocarbon well, the SBHP survey portion comprising a plurality of memory gauges, the plurality of memory gauges directly connected to each other in series at a terminal end of the logging system;
    providing a second crossover to connect the multi-finger calipers portion to the SBHP survey portion,
    conducting a SBHP survey while running the integrated well logging system in hole; and
    activating measuring arms of the multi-finger calipers upon reaching a target depth in the hydrocarbon well, and then pulling the integrated well logging system up the hydrocarbon well while continuously measuring, with the multi-finger calipers, a surface condition of the internal wall of the hydrocarbon well from the depth to surface.

2. The method according to claim 1, wherein the elongated stem portion further comprises a rope socket, a third crossover, a swivel joint, an elongated stem, and a knuckle jar.

3. The method according to claim 1, wherein the multi-finger calipers portion comprises a battery housing, and a caliper portion memory gauge, and where the plurality of measuring arms includes a first plurality of bendable caliper arms.

4. The method according to claim 3, further including electronics, power supplies, and sensors, and wherein the battery housing comprises a steel case configured to isolate the electronics, the power supplies, and the sensors from the hydrocarbon well.

5. The method according to claim 3, wherein the plurality of memory gauges comprise an electronic pressure gauge that samples and records downhole pressures, with data representing the downhole pressures being stored in a non-volatile memory, ready for downloading to an acquisition equipment when the integrated well logging system has been retrieved to surface.

6. The method according to claim 3, wherein the multi-finger calipers portion further comprises a multi-finger caliper tool, and a fourth crossover, and where the plurality of measuring arms includes a second plurality of bendable caliper arms.

7. The method according to claim 6, wherein the plurality of measuring arms comprises 20 to 120 fingers or measuring arms.

* * * * *

UNITED STATES PATENT AND TRADEMARK OFFICE
CERTIFICATE OF CORRECTION

| | |
|---|---|
| PATENT NO. | : 11,713,668 B2 |
| APPLICATION NO. | : 17/222078 |
| DATED | : August 1, 2023 |
| INVENTOR(S) | : Almulhim et al. |

It is certified that error appears in the above-identified patent and that said Letters Patent is hereby corrected as shown below:

In the Claims

Column 12, Claim 1, Line 6:
"from the depth to"
Should be changed to:
--from the targeted depth to--; and Column 12, Claim 5, Line 2:
"of memory gauges"
Should be changed to:
--of caliper portion memory gauges--.

Signed and Sealed this
Nineteenth Day of September, 2023

Katherine Kelly Vidal
*Director of the United States Patent and Trademark Office*